Dec. 26, 1944.   H. D. BURKHALTER, JR   2,365,676
PROPELLER PITCH CHANGE MECHANISM
Filed Feb. 27, 1943   2 Sheets-Sheet 1

INVENTOR
HARRY D. BURKHALTER, JR.
BY
ATTORNEYS

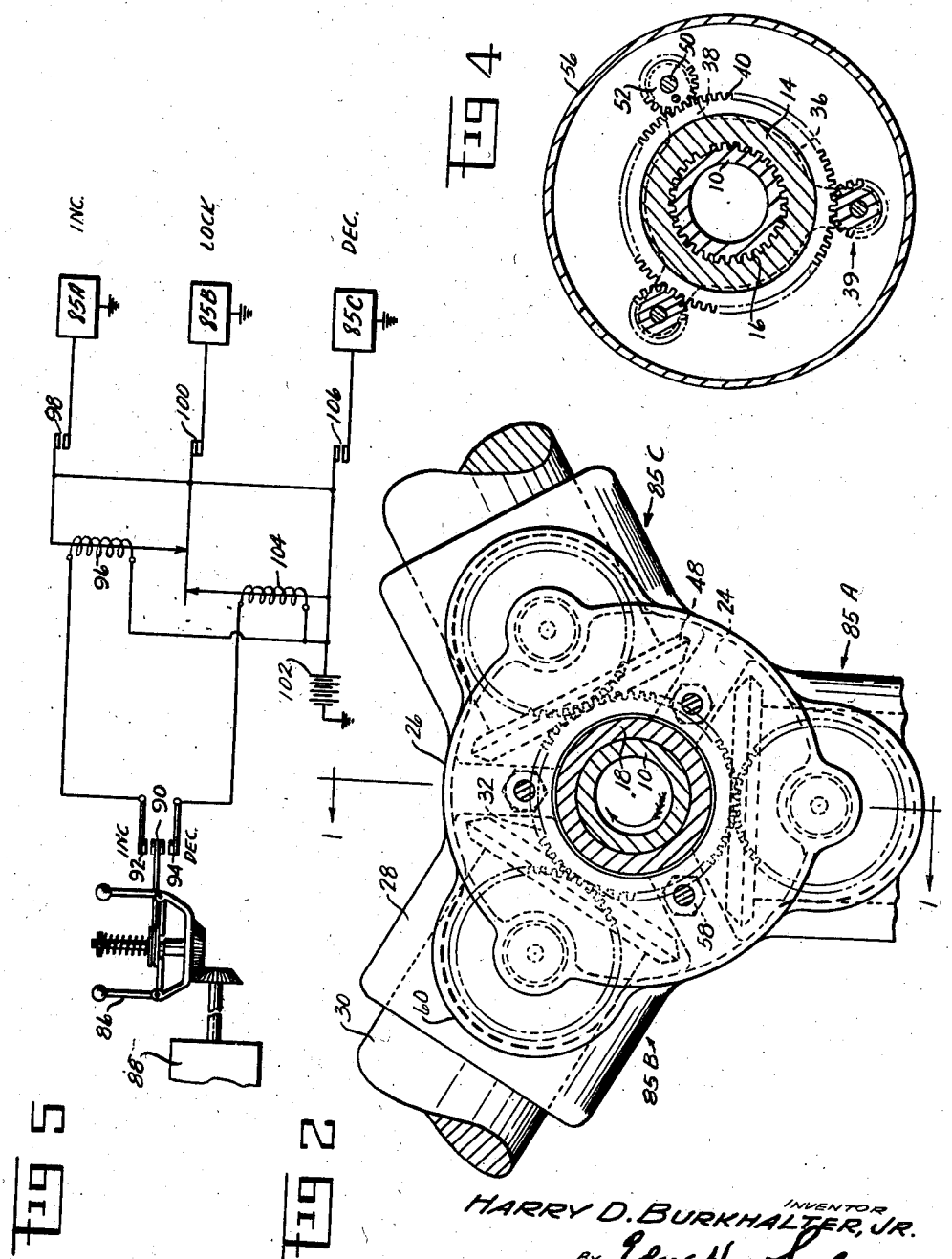

Patented Dec. 26, 1944

2,365,676

UNITED STATES PATENT OFFICE 2,365,676

PROPELLER PITCH CHANGE MECHANISM

Harry D. Burkhalter, Jr., Bowling Green, Ohio

Application February 27, 1943, Serial No. 477,408

8 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to adjustable pitch propellers for aircraft, and particularly to a mechanism for controlling the pitch of the blades.

The idea of employing the power unit which rotates the propeller to additionally effect changes in the pitch of the blades is broadly old, but heretofore the mechanism for accomplishing this result has usually consisted of differential gearing so arranged that the application of a brake to one or the other of two members rotated the propeller blades for increase or decrease of their pitch.

Mechanisms of this kind, as now known, are quite complicated, and, inasmuch as the ratio between the R. P. M. of the propeller hub and the R. P. M. at which the blades rotate about their axes is very high, a large number of speed reducing gears are usually required.

It is therefore an object of this invention to provide a gear mechanism of few parts and small dimensions which will possess the relatively great speed reducing capacity required in translating the high propeller hub speed to the slow pitch change rotation of the blades.

Another object of the invention is to provide a relatively simple control means for making the pitch changes automatically.

Other objects and advantages will become apparent from a consideration of the following description, taken in conjunction with the drawings, wherein, Fig. 1 is a longitudinal axial section taken at 1—1 of Fig. 2, through a propeller mechanism made according to my invention, a portion of the gearing and their operating mechanism being shown in elevation.

Fig. 2 is a rear end-view seen from the line 2—2 looking at Fig. 1 from the left.

Fig. 4 is a transverse section through another gear-set, the section being taken at 4—4 of Fig. 1.

Fig. 5 is a schematic illustration and wiring diagram illustrating automatic operation of the system.

Like numerals refer to like parts throughout the several views.

Construction

Figures 1, 3:
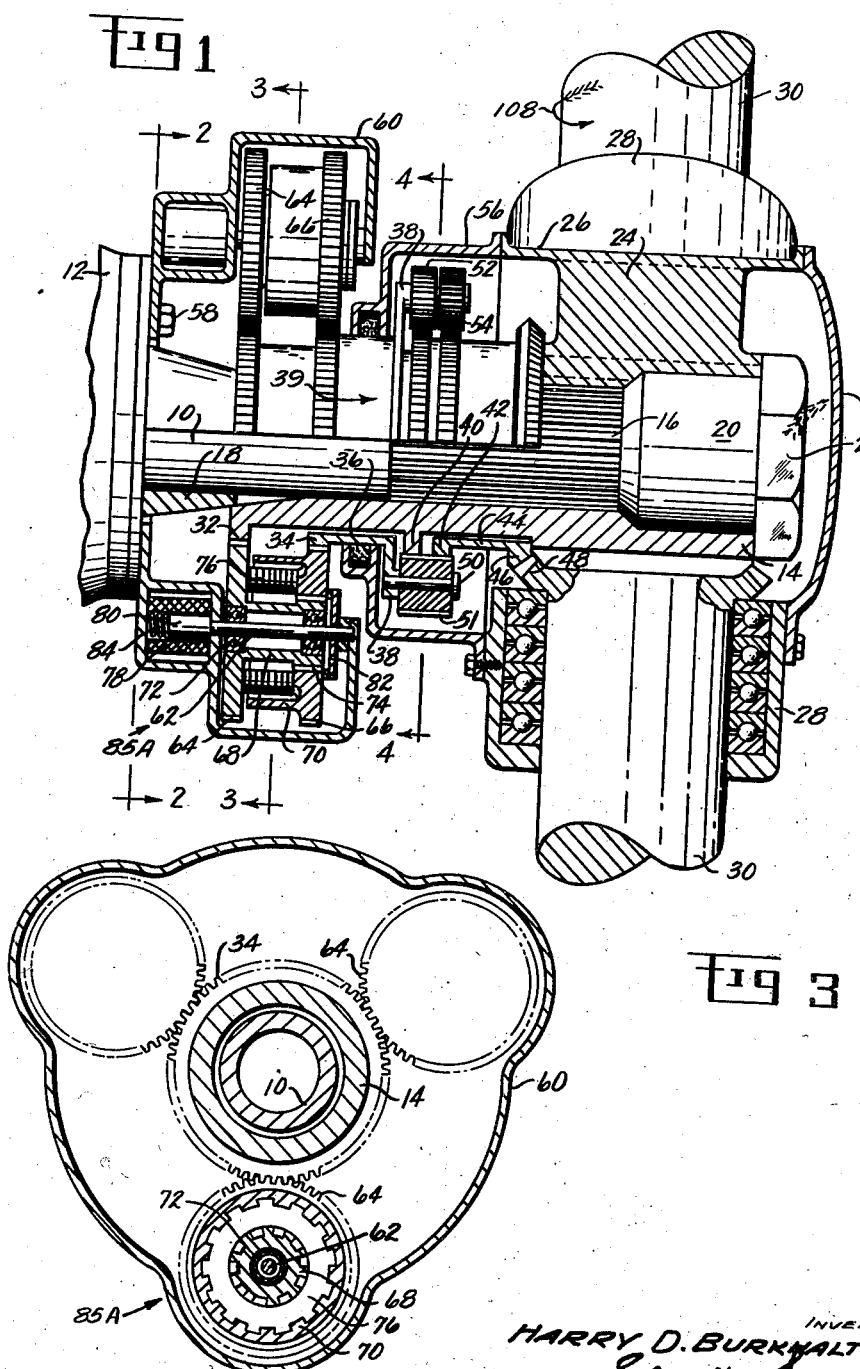
Fig. 3 is a transverse section through the several solenoid operated clutches and some of the gearing operated thereby, the section being taken at 3—3 of Fig. 1.

Mounted on the shaft 10 of an aircraft engine 12 is the propeller hub 14. The manner of securing the hub to the shaft may be conventional, as by the splined portion 16, conical collars 18 and 20 and the nut 22.

At the forward end, the hub 14 has radial spokes 24, the outer ends of which carry the cylindrical portion 26, which support the bearing housings 28 within which the blades 30 are rotatable.

A pitch control driving gear 32 is preferably integral with or otherwise permanently secured to the rear end of the hub 14. A pitch control driven gear 34, freely rotatable on the hub 14, may preferably be of substantially the same size as the pitch control driving gear, and should have the same number of teeth. The driven pitch control gear has a relatively long hub 36, at the forward end of which are formed a series of arms 38.

A planetary reaction gear 40 is integral with or otherwise permanently secured to the hub 14. A driven speed reducing gear 42, freely rotatable on the hub 14, is preferably, although not necessarily, of the same diameter and number of teeth as the reaction gear 40. The driven speed reducing gear 42 has a long hub 44, on the forward end of which there is formed a bevel gear 46. Mating bevel gears 48 are secured, one on the inner end of each blade 30, all gears 48 being in constant mesh with the gear 46.

The arms 38 of the planet pinion carrier 39 each carry a stud 50 upon which there is freely rotatable an elongated planet pinion 51, which has a face wide enough to engage the teeth of both gears 40 and 42. However, if the difference between the numbers of teeth in gears 40 and 42 is less than the number of arms 38, the teeth of one only of the pinions may extend straight across as on the pinion 51, while the other pinions will have the teeth of one half of the pinion as at 52 misaligned with the teeth of the other half 54. Such an elongated pinion may preferably be made by cutting portions 52 and 54 separately and joining them together by axially parallel rivets or similar means with the teeth of part 52 misaligned appropriately with the teeth of the part 54. An elongated pinion with the teeth of the two halves offset as at 52—54 may be made in one piece by cutting an annular groove between the two sets of teeth to a depth somewhat greater than the tooth depth to facilitate cutting. In the embodiment of the invention shown, there is only one tooth difference between gears 40 and 42 and there are three arms 38. It is therefore necessary to make two of the three elongated pinions as at 52, 54, and the other as at 51. If, however, the number of teeth in gears 40 and 42 are made to differ by as many teeth as there are pinion studs 50 on the carrier, then all of the planet pinions will be single as at 51, the teeth extending across both gears 40 and 42. The studs 50 are so positioned as to maintain constant mesh between the pinions 51, 52, 54 and the gears 40 and 42. The hub 36, the arms 38 and the studs 50 may collectively be referred to as the planet pinion carrier, and may be broadly designated by the numeral 39. A gear cover 56 encases the carrier 39, the speed reducing gears 40 and 42, and the pinions 51, 52 and 54.

Non-rotatably mounted on the nose of the engine 12 by screws 58 is the control gear and control pinion housing 60. The driving control gears 32 and driven control gear 34 have previously been described. Circumferentially spaced countershafts 62 near their ends are supported in the housing 60, and the driving and driven control pinions designated 64 and 66 respectively are rotatable on these countershafts.

Control pinion 64 has an externally splined hub 68 extending forwardly while control pinion 66 has an internally splined drum 70 extending rearwardly over the hub 68. Antifriction bearings 72 in the hub 68 rotatably support the gear 64, while roller bearings 74 rotatably support the gear 66 on the outside of the hub 68. A stack 76 of clutch discs, one toothed externally to fit the internal splines in the drum 70, and the next toothed internally to fit the external splines in the hub 68, are provided for the purpose of drivably connecting the pinion 64 to the pinion 66. Solenoid coils 78 are circumferentially spaced in the housing 60, one for each pair of control pinions 64 and 66, for the purpose of compacting the discs 76 to effect driving connection between the two pinions.

An enlarged portion 80 on each shaft 62 serves as a core for the solenoid. A flange 82 is fast on each shaft, whereby, when the solenoid coil is energized, the flange 82 is drawn up, the clutch discs 76 are compacted, and the pinions 64 and 66 are drivably engaged. An expansion spring 84 acts on the core 80 to disengage the clutch when the coil 78 is deenergized. The control pinion and solenoid clutch assembly, consisting of parts designated by the even numerals between 62 and 84, inclusive, may conveniently be referred to as control units, and be broadly designated by the numeral 85, and since there are three assemblies 85 which differ in a small particular, i. e., a difference of one tooth as between pinions 64 and 66, the several control units may preferably be further distinguished as the pitch increasing control unit 85A, the pitch locking control unit 85B, and the pitch decreasing control unit 85C.

While the clutches 76 are here shown as actuated by an electro-magnetic means, it is considered within the purview of the invention to employ fluid actuated hydraulic pistons for the same purpose.

It is here noted that the control gearing, consisting of gears 32 and 34, and pairs of pinions 64 and 66, is not, like the speed reducing gearing, of the planetary type, but consists merely of several stationary countershafts with pairs of pinions through which the driving control gear 32 rotates the driven control gear 34 at a synchronous speed, or at a greater or less speed, depending on which control unit is brought into play.

In the schematic view, Fig. 5, a governor 86, driven by an engine 88 is arranged to move a grounded contact 90 upward to engage the contact 92 to increase the pitch when the engine overspeeds, and downward to engage the contact 94 to decrease the pitch when the engine underspeeds.

Engagement of contacts 90 and 92 energizes relay 96, which closes the switch 98 and opens the switch 100, whereby current from the source 102 drivably engages the control pinions of control unit 85A and drivably disengages the pinion of control unit 85B.

On the other hand, engagement of contacts 90 and 94 energizes relay 104, which closes the switch 106 and opens the switch 100 whereby current from the source 102 drivably engages the pinions of control unit 85C and drivably disengages the pinions of control unit 85B. It will be observed that control unit 85B always becomes disengaged whenever either unit 85A or unit 85C becomes engaged.

Operation

The operation of the mechanism hereinbefore described may more readily be understood by specifying the number of teeth on each of the several control gears and pinions and on each of the several speed-reducing gears and pinions. Accordingly, Let gears 32, 34 and 42 each have 60 teeth.
Let gear 40 have 59 teeth.
Let pinion 64 and 66 in 85A have 40 and 41 teeth respectively.
Let pinion 64 and 66 in 85B have 40 and 40 teeth respectively.
Let pinion 64 and 66 in 85C have 40 and 39 teeth respectively.
Let pinions 52 and 54 each have 20 teeth.

As long as the engine 88 is "on speed," the governor 86 will hold the contact 90 out of engagement with both 92 and 94, whereby the switch 100 will remain closed and the pitch locking control unit 85B will be operative.

If the engine overspeeds, the contact 90 will engage 92, whereby the relay 96 simultaneously closes the switch 98 and opens the switch 100, and the pitch increasing control unit 85A will be operative to increase the propeller pitch.

If the engine underspeeds, the contact 90 will engage 94, whereby the relay 104 simultaneously closes the switch 106 and opens the switch 100, and the pitch decreasing control unit 85C will be operative to decrease the propeller pitch.

Since the pitch locking control unit 85B has an equal number of teeth on pinions 64 and 66, the driving gear 32 will rotate the driven gear 34 at one to one ratio so that the planet pinion carrier 39 will also rotate at one to one ratio whereby the pinions 51, 52, and 54 are prevented by gear 40 from rotating and the bevel gear 46 must rotate at propeller hub speed. As long, therefore, as control unit 85B is operative, no pitch change can take place.

Since the pitch increasing control unit 85A has 40 teeth on the pinion 64 and 41 teeth on the pinion 66, each rotation of the driving control gear 32 will advance the driven control gear 34 with respect to the propeller hub 14 through 1/40 turn, and since the gear 40 has 59 teeth and the gear 42 has 60 teeth, one turn of the carrier 39 with respect to the hub 14 will rotate the gear 42 through 1/60 turn with respect to the hub 14. The overall ratio between the driving control gear 32 and the driven speed reducing gear 42 is $1/40 \times 1/60 = 1/2400$, that is, with the pitch increasing control unit 85A operative, each propeller revolution will rotate a blade 30 through 1/2400 revolution in the pitch increasing direction as indicated by the arrow 108.

Since the pitch decreasing control unit 85B has 40 teeth on the pinion 66, each rotation of the driving control gear 32 will retard the driven control gear 34 with respect to the hub 14 an amount equal to 1/40 turn, and since the ratio through the speed reducing gear-set is 1 to 1/60, the overall ratio is $1/40 \times 1/60 = 1/2400$, that is with the pitch decreasing control unit 85B operative, each propeller revolution will rotate a blade 30 through 1/2400 revolution in the pitch decreasing direction, i. e., opposite to the arrow 108.

The rate of pitch change may conveniently be ascertained by means of the following equation:

(1) $$\frac{360(f-e)(d-c)r}{ed} = \text{degrees per second pitch change}$$

wherein, $c$ = number of teeth on speed-reducing reaction gear 40,
$d$ = number of teeth on speed-reducing driven gear 42,
$e$ = number of teeth on control pinion 64,
$f$ = number of teeth on control pinion 66, and
$r$ = revolutions of propeller per second.

Substituing for $c$, $d$, $e$, and $f$ in the equation, the numbers of teeth hereinbefore assigned to gears 40 and 42 and pinions 64 and 66, respectively, and making $r = 20$ propeller revolutions per second, the pitch change rate will be 3 degrees per second.

The above equation is applicable where there is a difference of one, two or more teeth between gears 40 and 42, and one, two or more teeth between pinions 64 and 66. Where the difference is only one tooth in each case, the equation may be further simplified to read (2)

$$\frac{360r}{ed} = \text{degrees per second pitch change}$$

wherein the values are the same as in Equation 1.

From the foregoing, it will be understood that the mechanism described will operate to positively lock against pitch change; to increase pitch at 3 degrees per second; or decrease the pitch at 3 degrees per second, depending on which of the three control units, 85A, 85B or 85C is actuated. A pitch change rate of 6 degrees per second could be readily had by merely making a difference of two teeth between gears 40 and 42 instead of 1 tooth as used in the example. A similar result may be had by providing equal numbers of teeth on speed-reducing gears 40 and 42, and making the elongated pinions all in two parts as at 52 and 54, and having one or more teeth difference between parts 52 and 54.

Instead of employing a pitch-locking control unit 85B, other means may be employed for locking the blade against pitch change and the other control units 85A and 85C employed as herein described. Various other modifications are possible within the scope of the following claims.

I claim:

1. A variable pitch propeller mechanism for an aircraft engine comprising a propeller hub, blades having their inner ends rotatable in said hub, bearings carried by said hub for rotatably supporting said blades, a speed-reducing gear housing carried by said hub, a control-gear housing non-rotatably attached to said engine, a control gear-set in said control gear housing comprising a driving control gear fast on said hub, a driven control gear, having the same number of teeth as said driving control gear, freely rotatable on said hub, and several control units, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving and the driven pinions having the same number of teeth, a third control unit comprising a countershaft, a driving pinion rotatable on said countershaft in mesh with said driving control gear, a driven pinion rotatable on said countershaft in mesh with said driven control gear, the driving pinion having one more tooth than the driven pinion, the three control units each having a clutch for joining the driving and driven pinions in driving relation, and electromagnetic means for engaging the clutches, and a planetary speed-reducing gear-set in said speed-reducing gear housing comprising a reaction gear fast on said hub, a driven speed-reducing gear freely rotattable on said hub, said reaction gear having one less tooth than said driven speed-reducing gear, a planet pinion carrier fast on said driven control gear, and one or more elongated planet pinions rotatable on said carrier, and revolved thereby about and in mesh with both said reaction and driven speed-reducing gears, a driving bevel gear fast on said driven speed-reducing gear and a driven bevel gear on each propeller blade in mesh with the driving bevel gear.

2. A variable pitch propeller mechanism for an aircraft engine comprising a propeller hub, blades having their inner ends rotatable in said hub, bearings carried by said hub for rotatably supporting said blades, a control-gear support non-rotatably attached to said engine, a control gear-set comprising a driving control gear fast on said hub, a driven control gear, having the same number of teeth as said driving control gear, freely rotatable on said hub, and several control units, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving and the driven pinions having the same number of teeth, a third control unit comprising a countershaft, a driving pinion rotatable on said countershaft in mesh with said driving control gear, a driven pinion rotatable on said countershaft in mesh with said driven control gear, the driving pinion having one more tooth than the driven pinion, the three countershafts being carried by said support and the three control units each having a clutch for joining the driving and driven pinions in driving relation, and electromagnetic means for engaging the clutches, and a planetary speed-reducing gear-set comprising a reaction gear fast on said hub, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears, power transmitting means fast on said driven speed-reducing gear and means on each propeller blade drivably connected to said power transmitting means.

3. A variable pitch propeller mechanism for an aircraft engine comprising a propeller hub, blades having their inner ends rotatable in said hub, bearings carried by said hub for rotatably supporting said blades, a control-gear support non-rotatably attached to said engine, a control gear-set comprising a driving control gear fast on said hub, a driven control gear, having the same number of teeth as said driving control gear, freely rotatable on said hub, and several control units, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving and the driven pinions having the same number of teeth, a third control unit comprising a countershaft, a driving pinion rotatable on said countershaft in mesh with said driving control gear, a driven pinion rotatable on said countershaft in mesh with said driven control gear, the driving pinion having one more tooth than the driven pinion, the three countershafts being carried by said support and the three control units each having a clutch for joining the driving and driven pinions in driving relation, and power means for engaging the clutches, and a planetary speed reducing gear-set comprising a reaction gear fast on said hub, a driven speed reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears, and power transmitting means connecting the said speed-reducing driven gear to the propeller blades to rotate said blades.

4. A variable pitch propeller mechanism comprising a propeller hub, blades having their inner ends rotatable in said hub, bearings carried by said hub for rotatably supporting said blades, a control gear-set comprising a driving control gear fast on said hub, a driven control gear, having the same number of teeth as said driving control gear, freely rotatable on said hub, and several control units, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving and the driven pinions having the same number of teeth, a third control unit comprising a countershaft, a driving pinion rotatable on said countershaft in mesh with said driving control gear, a driven pinion rotatable on said countershaft in mesh with said driven control gear, the driving pinion having one more tooth than the driven pinion, the three control units having their axes fixed and parallel to the hub axis, a clutch in each unit for joining the driving and driven pinions in driving relation, and power means for engaging the clutches, and a planetary speed-reducing gear-set comprising a reaction gear fast on said hub, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears, and power transmitting means rotatably connecting the speed-reducing driven gear to the propeller blades.

5. A variable pitch propeller mechanism comprising a propeller hub, blades having their inner ends rotatable in said hub, bearings carried by said hub for rotatably supporting said blades, a control gear-set comprising a driving control gear fast on said hub, a driven control gear, having the same number of teeth as said driving control gear, freely rotatable on said hub, and several control units with axes in fixed positions parallel to the hub axis, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving and the driven pinions having the same number of teeth, a third control unit comprising a countershaft, a driving pinion rotatable on said countershaft in mesh with said driving control gear, a driven pinion rotatable on said countershaft in mesh with said driven control gear, the driving pinion having one more tooth than the driven pinion, a clutch in each of the three control units for joining the driving and driven pinions in driving relation, and means for selectively engaging the clutches, and a planetary speed-reducing gear-set comprising a reaction gear fast on said hub, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears, and means drivably connecting the driven speed-reducing gear to the propeller blades.

6. A variable pitch propeller mechanism comprising a propeller hub, blades having their inner ends rotatable in said hub, bearings carried by said hub for rotatably supporting said blades, a control gear-set comprising a driving control gear fast on said hub, a driven control gear, having the same number of teeth as said driving control gear, freely rotatable on said hub, and several control units with axes in fixed positions parallel to the hub axis, one control unit comprising a countershaft, a driving pinion rotatable on said countershaft in mesh with said driving control gear, a driven pinion rotatable on said countershaft in mesh with said driven control gear, the driven pinion having one more tooth than the driving pinion, a second control unit comprising a countershaft, a driving pinion rotatable on said countershaft in mesh with said driving control gear, a driven pinion rotatable on said countershaft in mesh with said driven control gear, the driving pinion having one more tooth than the driven pinion, a clutch in each of the two control units for joining the driving and driven pinions in driving relation, and means for selectively engaging the clutches, and a planetary speed-reducing gear-set comprising a reaction gear fast on said hub, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears and means drivably connecting the driven speed-reducing gear to the propeller blades.

7. A variable pitch propeller mechanism comprising a propeller hub, blades having their inner ends rotatable in said hub, bearings carried by said hub for rotatably supporting said blades, a control gear-set comprising a driving control gear fast on said hub, a driven control gear, having the same number of teeth as said driving control gear, freely rotatable on said hub, and two control units with axes in fixed positions parallel to the hub axis, each control unit comprising a countershaft, a driving pinion rotatable on said countershaft in mesh with said driving control gear, a driven pinion rotatable on said countershaft in mesh with said driven control gear, one of the two pinions of each control unit having one more tooth than the other of the two, a clutch for each of the two control units for joining the driving and driven pinions in driving relation, and means for selectively engaging the clutches, and a planetary speed-reducing gear-set comprising a reaction gear concentrically secured on said hub for rotation therewith, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears and means drivably connecting the driven speed-reducing gear to the propeller blades.

8. A variable pitch propeller mechanism comprising a propeller hub, blades having their inner ends rotatable in said hub, bearings carried by said hub for rotatably supporting said blades, a control gear-set comprising a driving control gear fast on said hub, a driven control gear, having the same number of teeth as said driving control gear, freely rotatable on said hub, and two control units with axes in fixed positions parallel to the hub axis, each control unit comprising a countershaft, a driving pinion rotatable on said countershaft in mesh with said driving control gear, a driven pinion rotatable on said countershaft in mesh with said driven control gear, one of the two pinions of each control unit having more teeth than the other of the two, a clutch for each of the two control units for joining the driving and driven pinions in driving relation, and means for selectively engaging the clutches, and a planetary speed-reducing gear-set comprising a reaction gear concentrically secured on said hub for rotation therewith, a driven speed-reducing gear freely rotatable on said hub, said reaction gear having one less tooth than said driven speed-reducing gear, a planet pinion carrier fast on said driven control gear, and one or more elongated planet pinions rotatable on said carrier and revolved thereby about and in mesh with both said reaction and driven speed-reducing gears and means drivably connecting the driven speed-reducing gear to the propeller blades.

HARRY D. BURKHALTER, Jr.